US011922635B2

(12) United States Patent
Oberhuber et al.

(10) Patent No.: US 11,922,635 B2
(45) Date of Patent: Mar. 5, 2024

(54) SYSTEM AND METHOD FOR DETECTING THE NUMBER OF USERS ON AT LEAST ONE SKI RESORT RUN

(71) Applicant: SKADII GMBH, Telfs (AT)

(72) Inventors: Philipp Oberhuber, Vipiteno (IT); Gunter Tschinkel, Telfs (AT)

(73) Assignee: SKADII GMBH, Telfs (AT)

(*) Notice: Subject to any disclaimer, the term of this patent is extended or adjusted under 35 U.S.C. 154(b) by 345 days.

(21) Appl. No.: 17/280,654

(22) PCT Filed: Sep. 27, 2019

(86) PCT No.: PCT/IB2019/058232
§ 371 (c)(1),
(2) Date: Mar. 26, 2021

(87) PCT Pub. No.: WO2020/065606
PCT Pub. Date: Apr. 2, 2020

(65) Prior Publication Data
US 2022/0044415 A1    Feb. 10, 2022

(30) Foreign Application Priority Data

Sep. 27, 2018  (IT) .................. 102018000008982
May 6, 2019   (IT) .................. 102019000006570

(51) Int. Cl.
*G06T 7/20*     (2017.01)
*B61B 11/00*    (2006.01)
(Continued)

(52) U.S. Cl.
CPC ............... *G06T 7/20* (2013.01); *B61B 11/00* (2013.01); *F25C 3/04* (2013.01); *G05B 15/02* (2013.01);
(Continued)

(58) Field of Classification Search
CPC ............ G06T 7/20; G06T 2207/10016; G06T 2207/30196; G06T 2207/30242;
(Continued)

(56) References Cited

U.S. PATENT DOCUMENTS 9,495,600 B2 * 11/2016 Heu .......................... G06T 7/20
9,495,759 B2 * 11/2016 DeMartin ................. G06T 7/70
(Continued)

FOREIGN PATENT DOCUMENTS

DE   10 2014 002607    8/2014

OTHER PUBLICATIONS

Notification Concerning Submission, Obtention or Transmittal of Priority Document for International Application No. PCT/IB2019/058232 dated Jan. 22, 2020.
(Continued)

*Primary Examiner* — Ramesh B Patel
(74) *Attorney, Agent, or Firm* — Neal, Gerber & Eisenberg LLP

(57) ABSTRACT

A system for detecting the passage of users in a ski resort, the ski resort comprising a plurality of ski runs and a plurality of ski lifts; the system for detecting the passage of users comprising: an image sensor and a processing unit, which are connected in communication with each other; wherein the image sensor is configured to capture images, such as a video, of a portion of the ski run, and send them to the processing unit; the processing unit being configured to analyse said images, such as the video, and detect moving objects, such as moving in a given direction, and count said detected moving objects; such as the image sensor is a video camera.

8 Claims, 6 Drawing Sheets

(51) Int. Cl.
*F25C 3/04* (2006.01)
*G05B 15/02* (2006.01)
*G06F 3/14* (2006.01)
*H04N 7/18* (2006.01)
*B60Q 9/00* (2006.01)
*E01H 4/02* (2006.01)
*G06Q 10/06* (2023.01)
*G06Q 10/0631* (2023.01)

(52) U.S. Cl.
CPC ............... *G06F 3/14* (2013.01); *H04N 7/18* (2013.01); *B60Q 9/00* (2013.01); *E01H 4/02* (2013.01); *G06Q 10/06* (2013.01); *G06Q 10/0631* (2013.01); *G06T 2207/10016* (2013.01); *G06T 2207/30196* (2013.01); *G06T 2207/30242* (2013.01)

(58) Field of Classification Search
CPC ........... G06T 2207/30221; G06T 7/254; B61B 11/00; B61B 12/00; F25C 3/04; G05B 15/02; G06F 3/14; H04N 7/18; B60Q 9/00; E01H 4/02; G06Q 10/06; G06Q 10/0631; G07C 9/00
See application file for complete search history.

(56) References Cited

U.S. PATENT DOCUMENTS

| | | | | |
|---|---|---|---|---|
| 10,134,151 | B2* | 11/2018 | Liu | G06T 7/20 |
| 11,526,161 | B2* | 12/2022 | Fang | G05B 23/0254 |
| 2014/0053214 | A1* | 2/2014 | Walker | H04L 65/80 |
| | | | | 725/62 |
| 2014/0219570 | A1* | 8/2014 | Hanish | G06V 30/248 |
| | | | | 382/201 |
| 2014/0355829 | A1* | 12/2014 | Heu | G06T 7/20 |
| | | | | 382/103 |
| 2016/0012465 | A1* | 1/2016 | Sharp | G06Q 20/321 |
| | | | | 705/14.17 |
| 2016/0189391 | A1* | 6/2016 | Demartin | G08B 13/19602 |
| | | | | 382/103 |
| 2017/0098299 | A1* | 4/2017 | Liu | G06V 20/52 |
| 2019/0311649 | A1* | 10/2019 | Cook | G06Q 10/10 |
| 2022/0035320 | A1* | 2/2022 | Tschinkel | E01H 4/00 |
| 2022/0044415 | A1* | 2/2022 | Oberhuber | G06F 3/14 |

OTHER PUBLICATIONS

International Search Report and Written Opinion for International Application No. PCT/IB2019/058232 dated Dec. 12, 2019.
Notification of the Recording of a Change for International Application No. PCT/IB2019/058232 dated Jan. 27, 2021.
Italian Search Report for Italian Application No. IT 201800008982 dated Feb. 4, 2019.
Italian Search Report for Italian Application No. IT 201900006570 dated Nov. 8, 2019.
"Smart Ski Use Case—WISE-IoT," published by European Communications Standards Institute (ETSI) on Mar. 23, 2017.

* cited by examiner

SYSTEM AND METHOD FOR DETECTING THE NUMBER OF USERS ON AT LEAST ONE SKI RESORT RUN

PRIORITY CLAIM

This application is a national stage application of PCT/IB2019/058232, filed on Sep. 27, 2019, which claims the benefit of and priority to Italian Patent Application No. 102018000008982, filed on Sep. 27, 2018, and which claims the benefit of and priority to Italian Patent Application No. 102019000006570, filed on May 6, 2019, the entire contents of which are each incorporated by reference herein.

TECHNICAL FIELD

The present disclosure relates to a system for detecting the number of users on a ski resort run and a method related thereto. Moreover, the present disclosure relates to a system for managing a ski resort and a controlling method related thereto.

BACKGROUND

A ski resort generally comprises a plurality of ski runs, a plurality of ski lifts, wherein each ski lift usually serves more than one ski run of the plurality of ski runs; artificial snow systems along the ski runs; and a fleet of snow-groomer vehicles. Snowmobiles and motor vehicles such as off-road vehicles or open-top vans (pick-ups) can also be present.

Ski lifts can comprise various types of transport systems, most often rope-driven systems, and are used for transporting people from downstream stations to respective upstream stations.

Artificial snow systems and snow groomer vehicles, on the other hand, are used to prepare the snow of the ski runs. More precisely, artificial snow systems produce programmed amounts of snow to compensate for the lack of natural snow or, as appropriate, to guarantee relatively constant snow quality, especially where it tends to wear away more quickly or, still further, to prepare artificial structures such as jumps, bumps, half-pipes and the like in the increasingly popular snow parks and fun parks.

Efficient management of the facilities of a ski resort requires the use of a considerable amount of information, first of all it is necessary to know the real use of the ski runs in order to avoid dangerous situations or to plan ski run maintenance activities, for example snow-making operations on ski runs and/or preparation of the ski runs with snow groomer vehicles.

However, information is often not available immediately and/or not accurate.

Generally, the number of users who used the various ski runs can be obtained by data relating to the ski passes and/or the number of passengers carried by the ski lifts.

As mentioned before, however, ski passes and/or ski lifts can serve more than one ski run, so these counting methods cannot be used to obtain the precise number of users on each ski run. Furthermore, the prior art counting method cannot provide the number of users on each ski run in real time, it can only provide an estimated average number.

SUMMARY

One object of the present disclosure is to provide a system for detecting the passage of users in a ski resort, which reduces at least one of the drawbacks of certain of the prior art.

According to the present disclosure, there is provided a system for detecting the passage of users in a ski resort; the ski resort comprising a plurality of ski runs and a plurality of ski lifts; the system for detecting the passage of users comprising: an image sensor and a processing unit, which are connected in communication with each other; wherein the image sensor is configured to capture images, such as a video, of a portion of the ski run, and send them to the processing unit; the processing unit being configured to analyse said images, such as the video, and detect moving objects, such as moving in a given or designated direction, count said detected moving objects, and define a number of users passing on the ski run. In certain such embodiments, the image sensor is a video camera.

The users can be skiers, snowboarders or other types of users of a ski run.

According to certain embodiments, the processing unit is configured to compare each image with a reference image and detect moving objects from this comparison; in particular, the processing unit is configured to compare each pixel of the image with the respective pixel of the reference image and determine whether the result of the subtraction between the value of a datum of said pixel and the respective value of the datum of the respective pixel is greater than a first threshold value; such as, the datum of said pixel is the value of a shade of grey of the pixel, or one or more of the three colours—red, green and blue—that make up said pixel.

According to another embodiment, the processing unit is configured to check the detected moving object by analysing the neighbouring pixels; in particular, the processing unit is configured to compare each pixel near the detected moving object with the corresponding pixels of the reference image, and, in certain embodiments, determine whether each datum of said neighbouring pixels is greater than a second threshold value of the respective datum of the respective pixel of the reference image.

According to another embodiment, the processing unit is configured to only count the objects moving along a given or designated direction; in particular, it is configured to determine whether the detected moving objects are moving from a first portion of the image to a second portion of the image, wherein the first portion of the image captures an area of the ski run at a higher altitude than the area framed by the second portion and, if so, to count them.

Another object of the present disclosure is to provide a system for managing a ski resort, which reduces at least one of the drawbacks of certain of the prior art.

According to the present disclosure, there is provided a management system for managing a ski resort; the ski resort comprising a plurality of ski runs and a plurality of ski lifts; the management system comprising a central unit and at least one system for detecting the passage of users in a ski resort including an image sensor configured to capture a plurality of images of a portion of a ski run of a plurality of ski runs of a ski resort; and a processing unit configured to: receive, from the image sensor, data associated with the plurality of images of the portion of the ski run of the plurality of ski runs, and analyse the data associated with the plurality of images to detect any moving objects and count any detected moving objects to determine a number of users passing on the ski run of the plurality of ski runs. In these embodiments, the system for detecting the passage of users is connected in communication with the management system, in particular with the central unit, and sends the data regarding the passage of users to the management system, in particular to the central unit. The management system of certain such embodiments comprises a display interface, such as a display screen, and configured to show on the display interface the number of users passing on each ski run of the ski resort.

According to certain embodiments, the management system is connected in communication with a storage system and is configured to load into said storage system the data regarding the passage of users on the ski runs, said storage system being consultable through a web-based application and/or through a wireless network by users of the ski resort.

According to certain embodiments, the management system is configured to show on the display interface a map with the plurality of ski runs of the ski resort and associate each ski run with a different colour according to the detected number of users passing on said ski run.

Another object of the present disclosure is to provide a ski resort which reduces at least one of the drawbacks of certain of the prior art.

According to the present disclosure, there is provided a ski resort comprising a plurality of ski runs, a plurality of ski lifts, and the management system described herein.

According to certain embodiments, the management system is coupled in communication with the ski lifts and is configured to control each ski lift on the basis of the detected number of users passing on each ski run, in particular the management system is configured to increase or reduce the speed of each ski lift and/or regulate the access to each ski lift on the basis of the detected number of users passing on each ski run.

According to another embodiment, the ski resort comprises at least one snow-groomer vehicle, and the management system is connected in communication with the at least one snow-groomer vehicle and is configured to programme and/or drive the intervention of the at least one snow-groomer vehicle on the basis of the detected number of users passing.

According to another embodiment, the ski resort comprises at least one snow-groomer vehicle, and the management system is connected in communication with the at least one snow-groomer vehicle; wherein the management system is configured to work in a control mode when the at least one snow-groomer vehicle is active on one of the ski runs and check for the presence of at least one user on the ski run; the management system being configured to send an alarm signal to the at least one snow-groomer vehicle in the case where it detects the presence of at least one user on the ski run.

According to another embodiment, the ski resort comprises at least one artificial-snow system comprising a plurality of snow guns arranged along the ski runs; the image sensor is housed on one of the snow guns for each ski run; the plurality of snow guns are, in certain embodiments, connected in communication with the management system via a communication line; the processing unit is connected to the management system via said communication line.

According to another embodiment, the management system is configured to control and/or drive said artificial-snow system on the basis of the detected number of users passing on the ski run.

According to another embodiment, the artificial-snow system comprises a central control unit and/or a local control unit, and the processing unit of the system for detecting the passage of users is defined by the central control unit or by the local control unit.

According to another embodiment, the artificial-snow system comprises a central control unit; each snow gun comprises a local control unit connected to the central control unit via a communication system; and the system for detecting the passage of users is connected to the management system, in particular the central unit, via the communication system, in particular, the communication system being just one.

Another object of the present disclosure is to provide the use of a system for detecting the passage of users in a ski resort, which reduces at least one of the drawbacks of certain of the prior art.

According to the present disclosure, there is provided the use of a system for detecting the passage of users a ski resort comprising a plurality of ski runs and a plurality of ski lifts. In certain embodiments, the ski resort comprises at least one artificial-snow system comprising at least one snow gun; the image sensor of the system for detecting the passage of users is, in certain embodiments, housed on the snow gun.

According to certain embodiments, the ski resort comprises a management system connected to the artificial-snow system via a communication system; the system for detecting the passage of users being connected in communication with the management system, in particular the central unit, via the communication system.

Another object of the present disclosure is to provide a method for increasing the performance of a ski resort, which reduces at least one of the drawbacks of certain of the prior art.

According to the present disclosure, there is provided a method for increasing the performance of a ski resort; the ski resort comprising a plurality of ski runs and a plurality of ski lifts; the method comprises the step of installing a system, as described herein, for detecting the passage of users on at least one of the ski runs of the ski resort for detecting, such as in real time, the number of users passing on said ski run. In certain embodiments, the ski resort comprises at least one snow gun; and the method comprises the step of installing on a snow gun the image sensor of the system for detecting the passage of users.

Another object of the present disclosure is to provide a method for detecting the passage of users in a ski resort, which reduces at least one of the drawbacks of certain of the prior art.

According to the present disclosure, there is provided a method for detecting the passage of users in a ski resort; the ski resort comprising a plurality of ski runs and a plurality of ski lifts; the method for detecting the passage of users comprising the steps of: capturing images of a portion of the ski run, such as acquiring a video; analysing said images, such as the video; detecting moving objects in said images, such as moving in a given direction; and counting said detected moving objects.

According to certain embodiments, the step of detecting moving objects comprises: comparing each image with a reference image and detecting moving objects from this comparison; in particular, comparing each pixel of the image with the respective pixel of the reference image and determining whether a datum of said pixel is greater than the respective datum of the respective pixel of the reference image by a first threshold value; in certain embodiments, the datum of said pixel is a shade of grey of the pixel, or one or more of the three colours—red, green and blue—that make up said pixel.

According to another embodiment, the step of checking the detected moving object comprises the following substeps: analysing the pixels near the pixel defining the detected moving object; in particular, comparing each pixel near the pixel related to the detected moving object with the corresponding pixels of the reference image, and, in certain embodiments, determining whether each datum of said neighbouring pixels is greater than the respective datum of the respective pixel of the reference image by a second threshold value.

According to another embodiment, the step of counting moving objects comprises the sub-step of only counting the objects moving along a given direction; in particular, determining whether the detected moving objects are moving from a first portion of the image to a second portion of the image, wherein the first portion of the image captures an area of the ski run at a higher altitude than the area framed by the second portion and, if so, counting them.

Another object of the present disclosure is to provide a method for managing a ski resort, which reduces at least one of the drawbacks of certain of the prior art.

According to the present disclosure, there is provided a management method for managing a ski resort; the ski resort comprising a plurality of ski runs and a plurality of ski lifts; the management method comprising detecting the passage of users according to capturing, by an image sensor, a plurality of images of a portion of a ski run of a plurality of ski runs of a ski resort, and analysing, by a processing unit, the plurality of images to detect any moving objects and count any detected moving objects to determine a number of users passing on the ski run of the plurality of ski runs.

According to certain embodiments, the ski resort comprises at least one artificial-snow system comprising at least one snow gun; wherein the management method comprises the step of driving and/or controlling the at least one artificial-snow system on the basis of the detected number of users passing; a first portion of the plurality of snow guns being arranged along one ski run of the plurality of ski runs, and a second portion of the plurality of snow guns being arranged along another ski run of the plurality of ski runs; the detection method comprising the step of detecting the number of users passing on one said ski run and detecting the number of users passing along the other said ski run; the management method comprising the step of driving and/or controlling the first plurality of snow guns on the basis of the detected passage of users along the one said ski run and the second plurality of snow guns on the basis of the detected passage of users along the other said ski run.

According to another embodiment, the management method comprises the step of displaying a map representing the plurality of ski runs of the ski resort and information regarding the detected number of users passing, associated with each ski run; such as, each ski run represented being associated with a different colour according to the detected number of users passing on said ski run.

According to another embodiment, said map can be consulted through a web-based application and/or through a wireless network by users of the ski resort.

According to another embodiment, the ski resort comprises at least one snow-groomer vehicle; wherein the management method comprises the step of programming and/or driving and/or controlling the at least one snow-groomer vehicle on the basis of the detected passage of users.

According to another embodiment, the ski resort comprises at least one snow-groomer vehicle; wherein the management method comprises a control mode where it checks for the presence of at least one user on the ski run and sends an alarm signal to the at least one snow-groomer vehicle indicating information on the presence of users and the ski run on which the presence of said users has been detected. In certain such embodiments, the management method comprises the step of locating the at least one snow-groomer vehicle and sending an alarm signal to the at least one snow-groomer vehicle if said at least one snow-groomer vehicle is located on the same ski run as the one on which the at least one user has been detected.

According to another embodiment, the management method comprises the step of slowing down and/or speeding up and/or regulating the access to the ski lifts of the ski resort that serve the plurality of ski runs on the basis of the detected passage of users on the plurality of ski runs.

BRIEF DESCRIPTION OF THE DRAWINGS

Further features and advantages of the present disclosure will be apparent from the following description of non-limiting embodiments thereof, with reference to the figures of the accompanying drawings, wherein.

DETAILED DESCRIPTION

Figure 1:
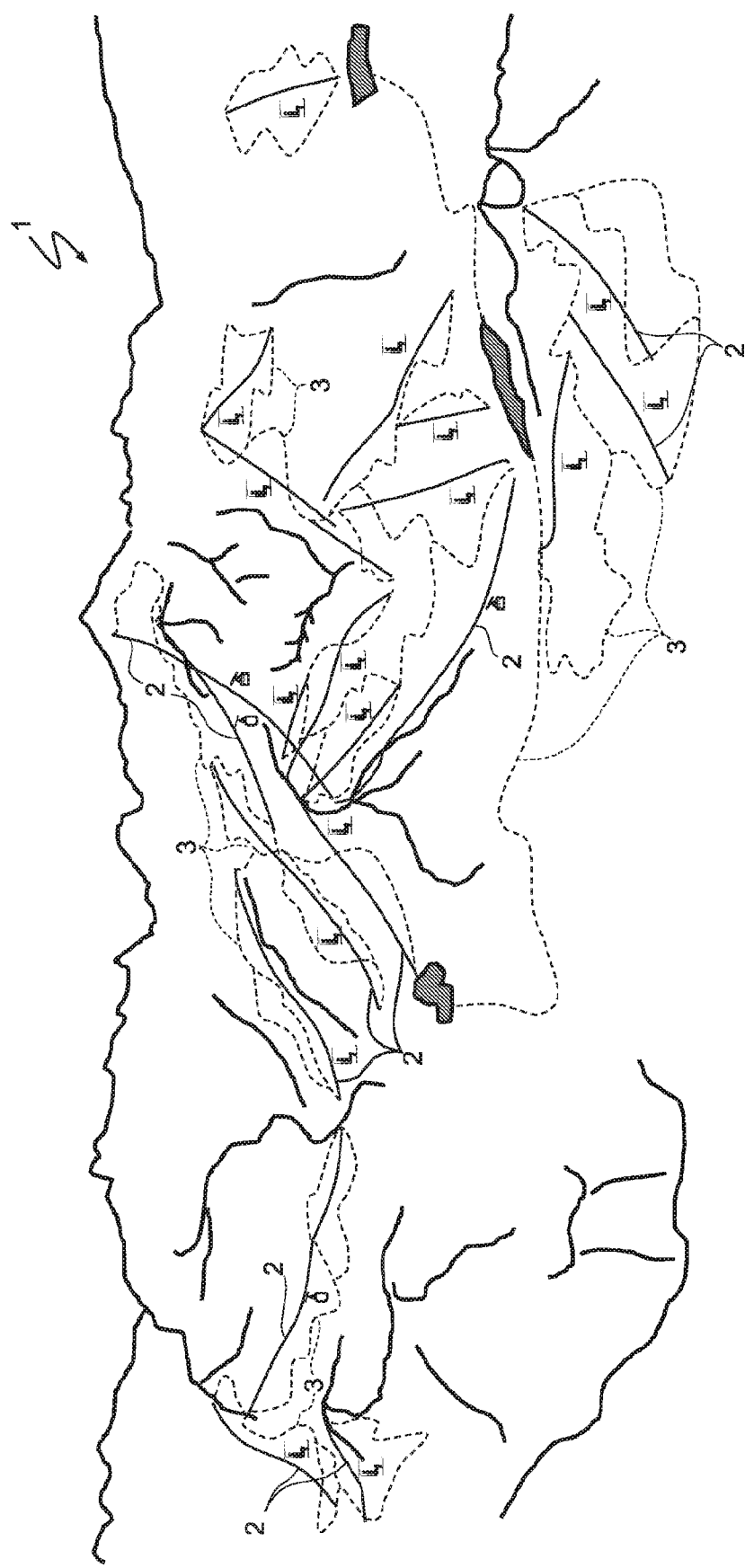
FIG. 1 is a schematic view of a ski resort.
Figure 2:
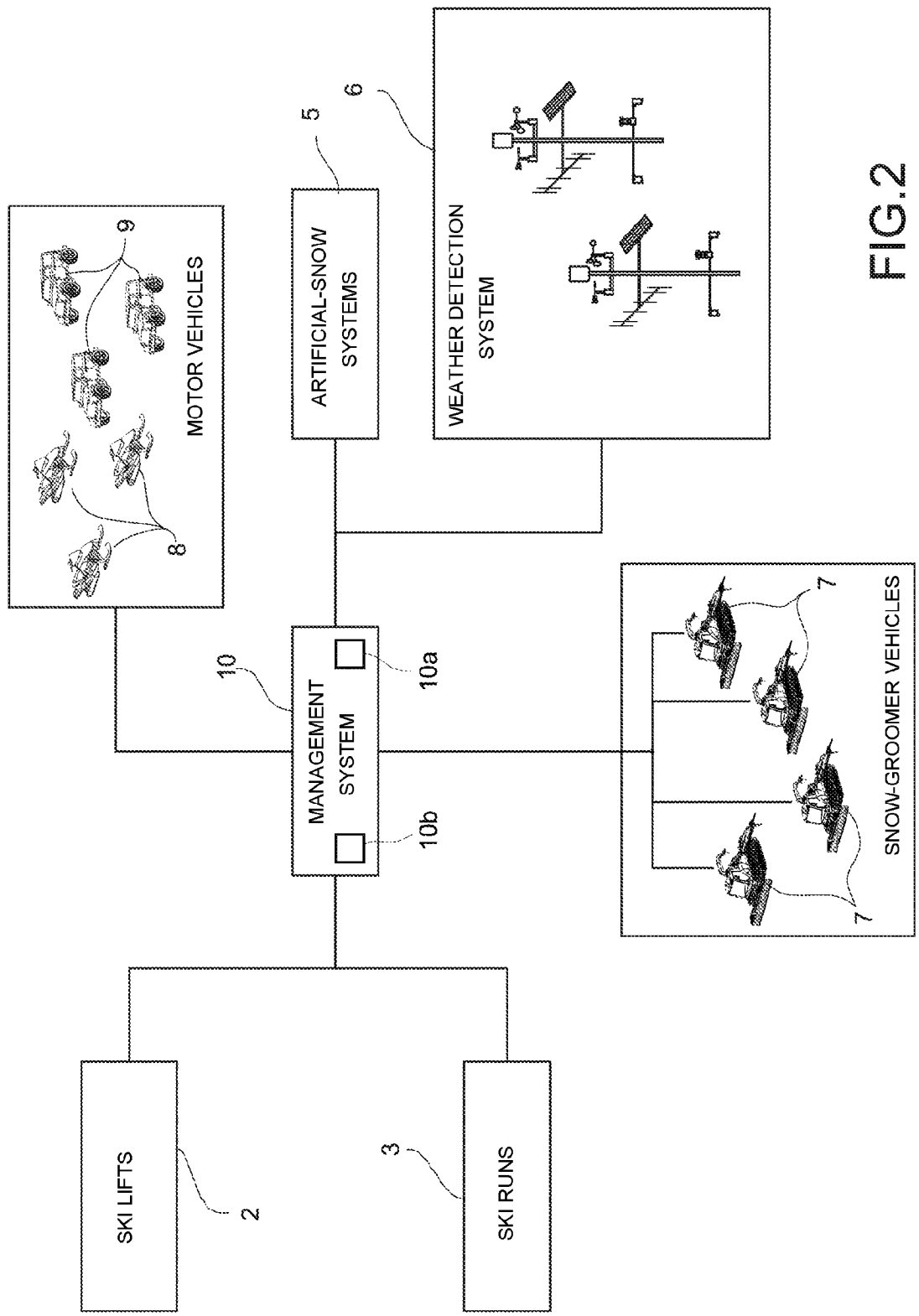
FIG. 2 is a simplified block diagram of a system for managing the ski resort of FIG. 1.
Figure 3:
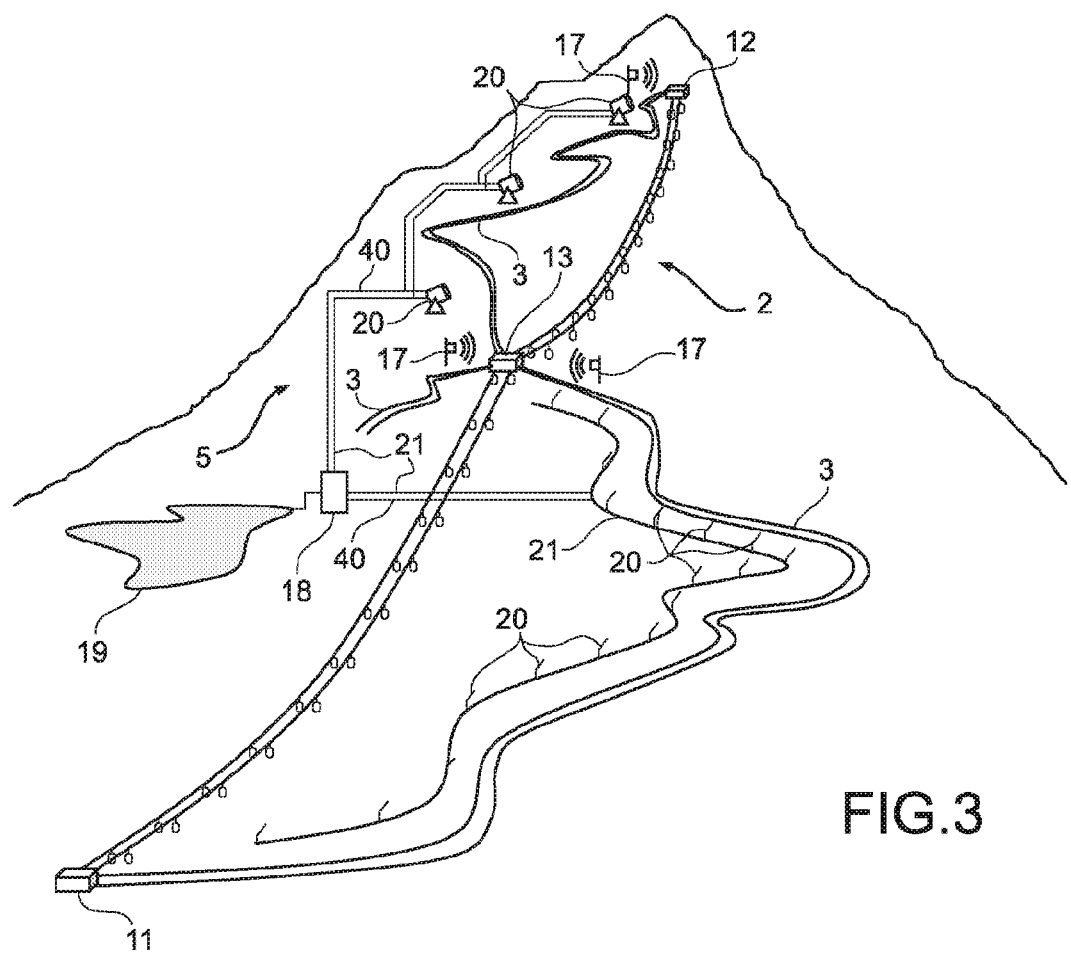
FIG. 3 is a more detailed view of a portion of the ski resort of FIG. 1.

With reference to FIGS. 1-3, a ski resort, indicated as a whole by the number 1, extends over a geographical area and comprises a plurality of ski lifts 2, a plurality of ski runs 3, artificial-snow systems 5, a weather detection system 6, a fleet of snow-groomer vehicles 7, a fleet of snowmobiles 8, and a fleet of motor vehicles 9. Furthermore, the ski resort 1 is managed by a ski resort management system indicated by the number 10, and for convenience simply referred to in the following as the "management system". The management system 10 comprises a central processing unit 10a.

The term "users" refers to any user of a ski run, including skiers, snowboarders or other types of users of the ski run.

FIG. 3 shows, by way of example, one of the ski lifts 2. For the sake of simplicity, here and in the following it is understood that ski lifts can comprise at least, but not exclusively, cable transportation systems (for example cableways, gondola cableways, telemixes, chair lifts, button lifts, funicular railways), cableless, rail transportation systems (for example, with a rack railway driving system) and conveyor belts, operating both on a level gradient and on a substantially flat land (for example, for connecting stations downstream of ski resorts not connected to each other by ski runs). Each ski lift 2 extends along a respective path, in particular a path with a difference in height, and has a first terminal station or downstream station 11 and a second terminal station or upstream station 12. Furthermore, some of the ski lifts 2, like the one in the example of FIG. 3, can have intermediate stations 13.

Figure 4:
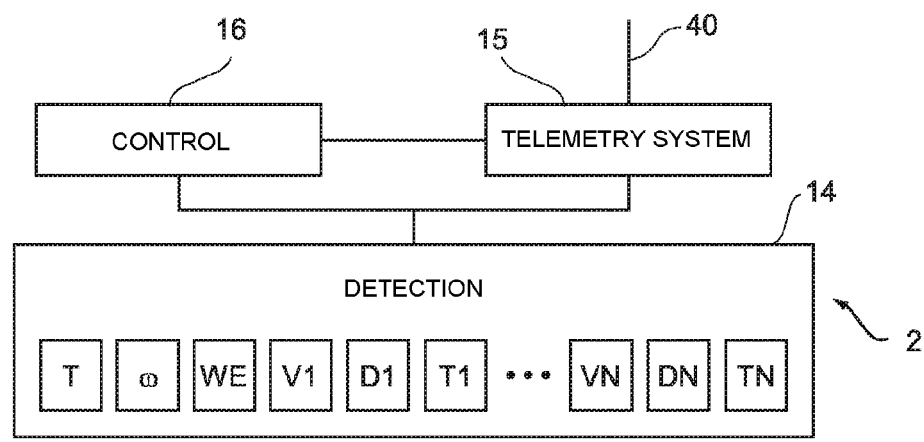
FIG. 4 is a simplified block diagram relating to a ski lift of the ski resort of FIG. 1.

The ski lifts 2 are equipped with detection equipment 14 (FIG. 4) and with a coupled telemetry system 15 in communication with the management system 10, in particular with the central unit 10a. The detection equipment 14 can comprise sensors and meters of various kinds and is configured to detect quantities relating to the operating state and condition of the respective ski lift 2. For example, the detection equipment 14 can be used to detect a torque applied to a driving pulley in a cable system, an angular speed of the driving pulley, the total electric power absorbed, environmental conditions, such as wind speed and direction at one or more points along the paths of the respective ski lifts 2. Moreover, the ski lifts 2 are equipped with respective control systems 16 which, among other things, provide status signals relating to operating conditions of parts of the ski lifts themselves, and turnstile control systems.

The ski runs 3 extend over slopes of the geographical area (FIGS. 1 and 3) and are served by respective ski lifts 2, not necessarily in a one-to-one correspondence.

In one embodiment, systems 17 configured to detect the passage of users are located along the ski runs 3, for counting the actual number of users passing on the ski runs or on sections of the ski runs. For example, systems 17 configured to detect the passage of users can be installed at the beginning and at the bifurcations of the ski runs 3.

Figure 5:
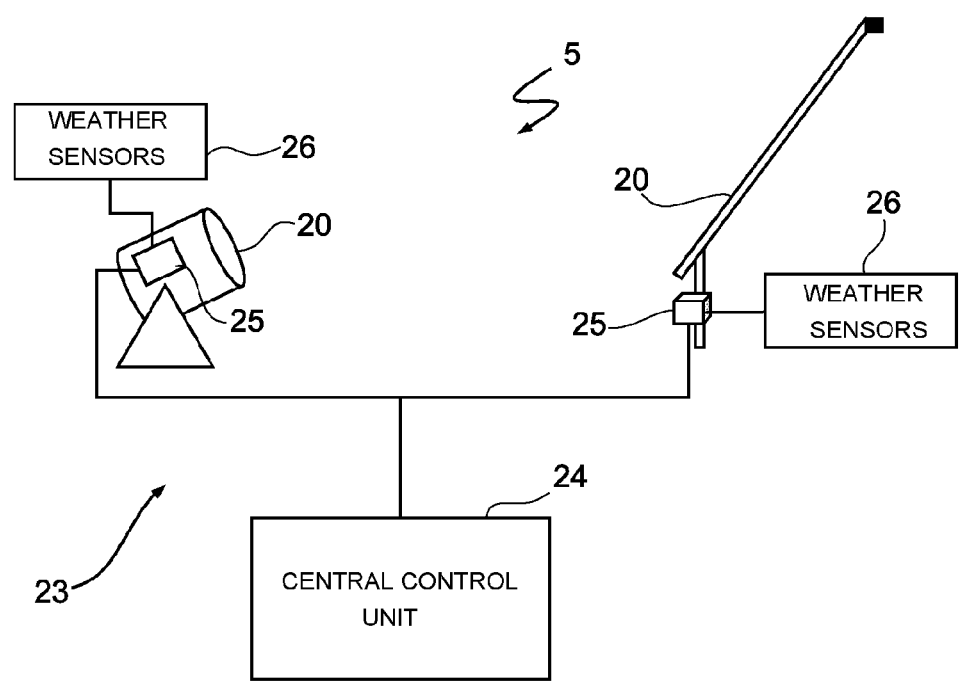
FIG. 5 is a simplified diagram relating to a portion of the ski resort of FIG. 1.

The artificial snow systems 5 extend along at least some of the ski runs 3 of the ski resort 1 (FIG. 3) and comprise pumping stations 18, fed by water supply sources 19, and a plurality of snow guns 20 connected to respective pumping stations 18 by pipes 21. The snow guns 20 can be of any known type, for example stationary or mobile snow cannons and lances. As seen in FIG. 5, the artificial snow systems 5 are equipped with respective control systems 23, which can comprise a central control unit 24 and local control units 25, which are located at respective snow guns 20 and coupled in communication with the respective central control unit 24 via a cable or radio communication system 40.

In certain embodiments, the communication system 40 can be integrated in the pipes 21 or external thereto, in particular via cable or radio. When the communication system 40 is integrated in the pipes 21, the communication system 40 itself is placed within the housing run through by the pipes 21, or in the same covering of the pipes 21; therefore, in this case, the same housing is travelled both by the power cables and the data cables for the communication system 40.

Figure 6:
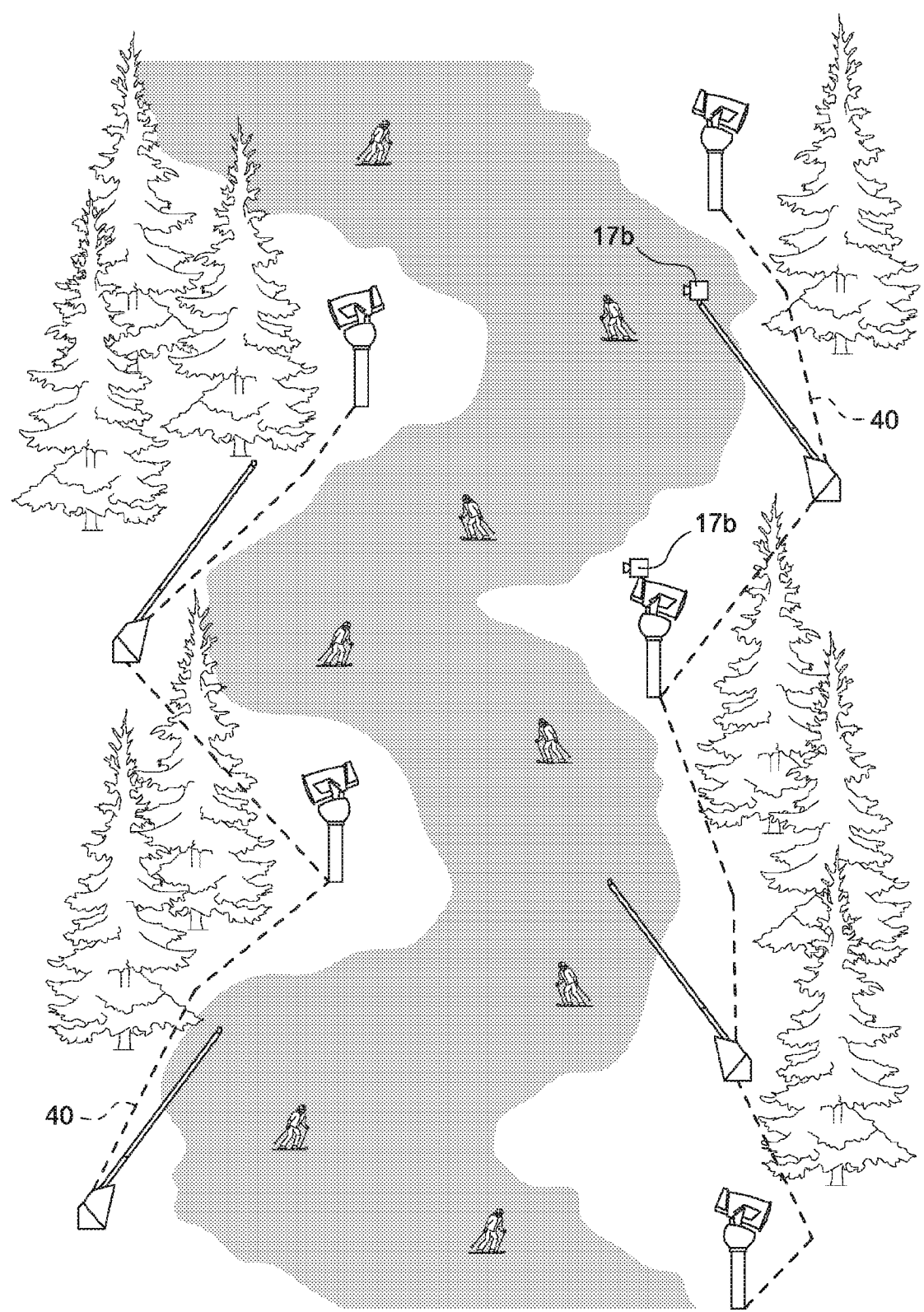
FIG. 6 is a more detailed view of another portion of the ski resort of FIG. 1, in particular a portion of a ski run with a portion of an artificial-snow system and a portion of a device for detecting objects moving on the ski run.
Figure 7:
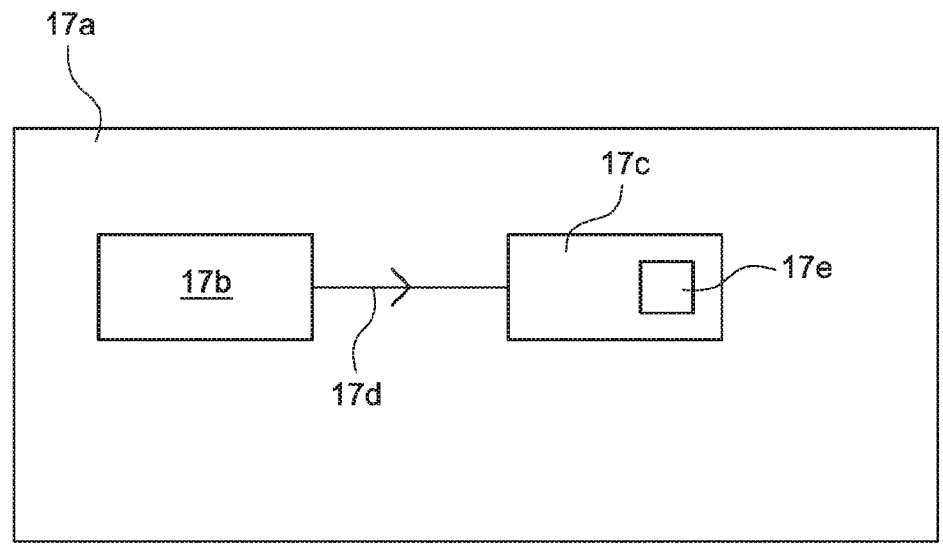
FIG. 7 is a simplified block diagram of a device of the artificial-snow system for detecting moving objects.
Figure 8:
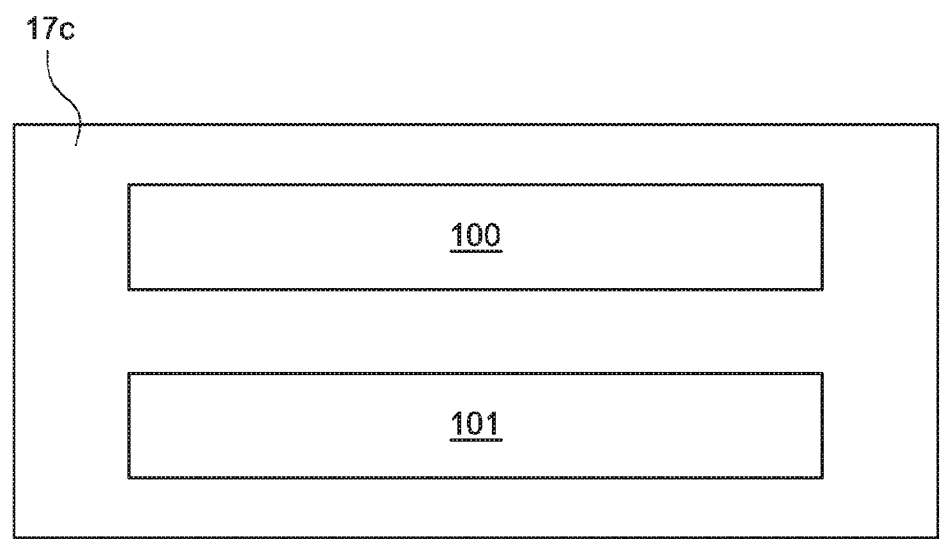
FIG. 8 is a simplified block diagram of a portion of the device for detecting moving objects in FIG. 7.

With reference to FIGS. 6 and 7, the system 17 for detecting the passage of users comprises at least one device 17a configured to detect the passage of users on each ski run 3.

Each device 17a for detecting the passage of users comprises at least one image sensor 17b, in particular a video camera. The video camera may be a monochrome video camera, a colour video camera, a thermal imaging camera, an infrared video camera, or a combination thereof. In other words, each device 17a for detecting the passage of users comprises one or more sensors selected from the group consisting of: a monochrome video camera, a colour video camera, an infrared video camera, a thermal imaging camera.

In an alternative embodiment of the present disclosure, the device 17a for detecting the passage of users comprises a radar sensor system.

In another embodiment, the image sensor 17b is a colour or monochrome or infrared camera, or a combination thereof.

For example, each device 17a for detecting the passage of users comprises a video camera or an infrared video camera or a thermal imaging camera or a combination of two or more of the above; or, for example, an infrared video camera or a thermal imaging camera and a radar sensor system for night vision.

The image sensor 17b is located in a position along the ski run 3 and is configured to frame the ski run 3.

In certain embodiments, the image sensor 17b is arranged on one of the plurality of snow guns 20 of the respective ski run 3. In one such embodiment, the image sensor 17b is housed on a snow cannon.

In another embodiment, the image sensor 17b is housed on a lance.

In another embodiment, the image sensor 17b is housed on a weather station of the weather detection system 6.

In another embodiment, the image sensor 17b is arranged on a dedicated structure, in other words it is housed on a supporting structure specially installed at the edges or above the ski run 3 to house the image sensor 17b. In particular, the image sensor 17b frames a portion of the ski run 3 which has a slope such that it is no longer possible to go back. In particular, the image sensor 17b frames a portion of the ski run 3, which is a portion following the initial portion and has a given or designated slope.

Furthermore, each device 17a for detecting the passage of users comprises a processing unit 17c coupled to the image sensor 17b.

The image sensor 17b sends data relating to the images in real time, in particular it sends the videos in the form of a video signal, in real time, to the processing unit 17c via a cable or radio connection 17d.

The processing unit 17c comprises a module 100 for detecting moving objects, which is configured to analyse the images, in particular the video, arriving in real time from the image sensor 17b, and to detect objects moving in the video sequence, in particular to detect objects moving at least in part in a given direction.

In the following, the word video or video sequence or videostream will be used interchangeably to refer to a sequence of successive images.

The processing unit 17c comprises a memory 17e storing a reference image, which is defined when the ski run is empty and without skiers.

In greater detail, in order to detect moving objects, the module 100 for detecting moving objects is configured to operate through the following steps:

(A) Each image of the video is processed to reduce or remove the background noise; in certain, non-limiting embodiments of the present disclosure, this noise reduction step is carried out by blurring the image through the application of a Gaussian filter.

(B) If the video is a colour video, therefore in RGB format, it is converted into a monochrome video, in particular into a greyscale video, so that each pixel of the video is represented by a value representing the greyscale shade of that particular pixel.

(C) The moving objects are detected by analysing each image and subtracting, from each pixel of the image, the value of the corresponding pixel in the reference image; the result of each subtraction is evaluated and if it is greater than a threshold value, then the analysed pixel is detected as a moving object in the analysed image, if it is less than a threshold value, the analysed pixel does not correspond to a moving object. In certain, non-limiting embodiments, to avoid false positives, for example due to background noise or other causes, once a moving object has been detected, a checking procedure is performed by analysing the pixels close to the pixels associated with the moving object. In greater detail, a predefined number of pixels close to the pixel corresponding to a moving object are analysed; the value of each neighbouring pixel is subtracted from the value of the corresponding pixel of the reference image, and the result is compared to a second threshold value. If each of the results of the subtraction is greater than the second threshold value, then the checking has a positive outcome and consequently the moving object is validated and the next steps are undertaken. In this embodiment, the number of neighbouring pixels is defined during the setting phase and can be subsequently adjusted by an operator skilled in the detection system. In greater detail, the neighbouring pixels are the pixels that are included around the pixel relating to the object moving inside a square, whose dimensions are defined during the setting phase. It is understood that the checking sub-step described herein is an optional sub-step, which gives a relatively higher resolution of the measurement of the moving objects because it reduces false positives, but can also be omitted.

(D) In certain embodiments, if the system has detected one or more moving objects in step (C), these one or more moving objects are defined by a square that is represented by a specific area with its central point having an x coordinate and a Y coordinate. This object is assigned a unique ID.

(E) Once an object has been assigned a unique ID in step (D), this object is traced by associating the object found in an image with the object closest to it detected in the subsequent image. In other words, the object detected in image n is associated with the object closest to it detected in image n+1. Subsequently, the movement of the detected moving object is calculated. If this movement is less than a third threshold, then the two objects in the consecutive images are determined to correspond to the same moving object, and the object detected in said subsequent image (image n+1) is assigned the same unique ID as that of the object detected in the previous image (image n). In this way, the object can be traced from the first time it is detected in an image in the video until it is detected in the other images of the video. In other words, the object is traced from the moment it enters the area framed by the image sensor 17b until it leaves the area framed by the image sensor 17b.

It should be appreciated that in certain embodiments, step (B) is an optional step that can be omitted.

In a non-limiting embodiment of the present disclosure, the comparisons of the images can be made between the values of one or more of the colours red, green and blue of each pixel composing the colour images.

The processing unit 17c comprises a counter module 101 configured to count moving objects which is coupled to the detection module 100 for detecting moving objects, in order to count the objects detected by the detection module 100.

In particular, the counter module 101 for counting moving objects is configured to operate through the following steps:

(F) The images in the video are divided into two halves; a first half and a second half; the dividing line can be horizontal or oblique. The first half is defined as the half that frames an area of the ski run that has a height above sea level greater than the area framed by the second half. If a moving object is detected in the first half and the same moving object (same unique ID) is detected in a subsequent image in the second half or on the dividing line, then the counter module increases its number by one unity.

The detection module 100 and the counter module 101 can be defined by hardware elements or software elements, or a combination of both. In particular, the detection module 100 and the counter module 101 can be formed by lines of software code running on a common hardware platform.

The device 17a for detecting the passage of users comprises a communication module 17e, which is connected via the communication line 40, which can be a cable or radio communication line, to the management system 10, in particular to the central unit 10a. In these embodiments, at each predefined time interval, the device sends the number of detected moving objects to the management system 10, in particular to the central unit 10a. Furthermore, when the device 17a for detecting the passage of users has sent the number of moving objects, it zeros the counter.

In particular, at each defined time interval, the number of detected moving objects is transmitted via the communication module 17e to the management system 10, in particular to the central unit 10a, and the number of the counter is zeroed.

The management system 10, in particular the central unit 10a, comprises a set of counters that count the number of passages received in a plurality of units of time. By way of example, the units of time are 24 hours, one day of operation of the ski resort, or the entire ski season, one hour, and multiples and submultiples of said units of time.

In certain embodiments and with reference to FIG. 6, the image sensor 15b is mounted on one of the snow guns 20, in particular a snow cannon or a snow lance.

Moreover, in these embodiments, the communication line 17e which connects the device 17a for detecting the passage of users to the management system 10, in particular to the central unit 10a, is defined by the communication line 40 which connects the snow guns 20 to the management system 10. In other words, in this embodiment, the communication line 40 is also used by the system 17 for detecting the passage of users. Therefore, in this embodiment, the communication line 40 has both the function of carrying information for the operation of the artificial-snow system 5 and the function of carrying information for the system 17 for detecting the passage of users. In particular, the communication line 40 can comprise the communication line 17e, and/or incorporate it and/or replace it.

Moreover, in certain embodiments, the image sensor 15b is housed on a weather station of the weather detection system 6 or in a structure specifically set up for it.

In another embodiment, the processing unit 17c is housed inside the snow gun 20.

In another non-limiting embodiment of the present disclosure, the image sensor 17b of the device 17a for detecting the passage of users is housed on one of the snow guns 20, and the processing unit 17c is defined by, in particular included in, the local control unit 25 of the respective snow gun 20. In particular, the local control unit 25 has both the function of managing the snow gun 20 and the tasks of the processing unit 17c, and is connected in communication with the image sensor 17b. In other words, the local control unit 25 of the snow gun 20, in addition to implementing the functions of controlling the respective snow gun 20, also implements the functions of the processing unit 17c of the device 17a for detecting the passage of users.

In another embodiment, the processing unit 17c is defined by, in particular included in, the central control unit 24 of the artificial snow system 5. In particular, the central control unit 24 has both the function of managing the artificial snow system 5 and the tasks of the processing unit 17c, and is connected in communication with the image sensor 17b. In certain embodiments, the image sensor is housed on one of the snow guns 20 of the artificial snow system 5. In other words, the central control unit 25 of the artificial snow system 5, in addition to implementing the functions of controlling the artificial snow system 5, also implements the functions of the processing unit 17c of the device 17 for detecting the passage of users.

In these last two embodiments described herein, the system 17 for detecting the passage of users can comprise: (i) a first plurality of devices 17a for detecting the passage of users, wherein each one is arranged completely or partially in one of the artificial snow systems 5 and/or in a respective snow gun 20, (ii) a second plurality of devices 17a for detecting the passage of users arranged on weather stations of the weather detection system 6, and (iii) a third plurality of devices 17a for detecting the passage of users on dedicated structures. Alternatively, the system can comprise only one or two of said three pluralities of devices 17a for detecting the passage of users.

In certain, but non-limiting embodiments, the partial or aggregated data received from the management system 10 is transmitted to a server and consulted via a website or application on a mobile device by the users of the ski runs 3 and/or by other operators.

The management system 10 receives the number of users passing on each ski run 3 of the ski resort 1 in real time and comprises a display interface 10b, for example a screen or a display, and displays on said display interface 10b the users passing on each ski run. In certain embodiments, the management system 10 is configured to show on the display interface 10b all the ski runs 3 of the ski resort 1 and associate different colours to each ski run based on the number of users detected in real-time. In particular and by way of example, each ski run 3 can be shown in green if the number of users is less than a first given or designated threshold of users, in red if it is greater than a second given or designated threshold of users, and in yellow if it is greater than the first threshold of users and less than the second threshold of users. The operators can have a complete and immediate awareness of the situation of each ski run 3 by looking at the screen and take actions for user safety and/or for scheduled maintenance of said ski run at the end of the day. Furthermore, the data relating to each ski run and to other units of time can be displayed on said map. In other words, the total number of passages of users detected until that moment in relation to the entire operating day, or the entire ski season, or one hour, or multiples and submultiples of said units of time, can be displayed thereon.

Said map can also be shown to the users through a web-based application.

Furthermore, the management system 10 can control the entrance turnstiles of the ski resort 1 or the speed of the ski lifts 2 based on the number of users on each ski run. Lastly, the management system 10 can order the temporary closure of some ski runs 3 if the number of users is greater than a fourth threshold of users.

In another non-limiting embodiment of the present disclosure, when the snow-groomer vehicles 7 are operating on the ski run 3, the management system 10 activates the control mode, and the system 17 for detecting the passage of users also operates in control mode. In this mode, above-described step (F) is omitted and consequently the system 17 for detecting the passage of users detects the presence of moving objects in any direction. In this mode, if the management system 10, in particular the central unit 10a, receives a signal from the system 17 for detecting the passage of users that indicates the presence of a user on a specific ski run 3, then the management system 10 sends an alarm signal to all the snow-groomer vehicles indicating that at least one user is present on the ski run 3. In certain embodiments, the management system 10 locates all the snow-groomer vehicles and checks whether any of the snow-groomer vehicles is present on the ski run on which a user has been detected and, if so, sends an alarm signal to the snow-groomer vehicle to warn it of the presence of users on the ski run 3.

In certain embodiments, the above-described system 17 for detecting the passage of users can be installed in an already existing ski resort devoid of such a system 17 for detecting the passage of users. Therefore, in this embodiment, the system 17 for detecting the passage of users will be installed as a retrofit in the ski resort. In certain embodiments, said modified ski resort will comprise an artificial snow system 5 and the system 17 for detecting the passage of users comprising image sensors 17b housed on snow cannons or lances. Moreover, in this embodiment, the devices 17a for detecting the passage of users will be fed and connected to each other by the feed and communication system of the artificial snow system 5 already present in the ski resort 1.

In certain non-limiting embodiments, the system for detecting the passage of users described herein can be implemented as a system for detecting the passage of users in the management system of Italian patent application no. 102018000008982 (filed on Sep. 27, 2018 in the name of HTI Digital GMBH). In other words, one embodiment of the disclosure comprises using the system for detecting the passage of users described herein as a system for detecting the passage of users within the management system of Italian patent application no. 102018000008982 (filed on Sep. 27, 2018 in the name of HTI Digital GMBH).

It should be appreciated that that modifications and variations may be made to the disclosure described herein without departing from the scope of the appended claims. That is, the scope of protection of the present disclosure is defined by the claims which cover variants not specifically described and equivalent embodiments. Accordingly, various changes and modifications to the presently disclosed embodiments will be apparent to those skilled in the art.

The invention claimed is:

1. A management system configured to manage a ski resort comprising a plurality of ski runs and a plurality of ski lifts, the management system comprising:
   a central unit;
   at least one detection system associated with at least one portion of at least one ski run of the plurality of ski runs, each detection system comprising:
      an image sensor configured to capture a plurality of images of the portion of the ski run associated with that detection system, and
      a processing unit configured to:
         receive, from the image sensor, data associated with the plurality of images of the portion of the ski run associated with that detection system,
         analyze the data associated with the plurality of images to detect any moving objects and count any detected moving objects to determine a number of users passing on the portion of the ski run associated with that detection system, and
         communicate the number of users passing on the portion of the ski run associated with that detection system to the central unit; and
   a display interface in communication with the central unit and configured to display each number of users passing on each of the plurality of ski runs associated with each of the detection systems, wherein based on the number of users passing on at least one of the plurality of ski runs, the central unit is configured to at least one of: program a snow groomer vehicle of the ski resort, program a snow gun of an artificial-snow system associated with the at least one of the ski runs, intervene an operation of the snow groomer vehicle, and intervene an operation of the snow gun.

2. The management system of claim 1, further comprising a storage system accessible via at least one of a web-based application and a wireless network.

3. The management system of claim 1, wherein the display interface is configured to display a map with the plurality of ski runs of the ski resort and associate each ski run with a different color based on the number of users passing on that ski run.

4. The management system of claim 1, wherein based on the number of users passing on each ski run, the central unit is configured to control each of the plurality of ski lifts by at least one of: modifying a speed of that ski lift and regulate access to that ski lift.

5. The management system of claim 1, wherein when at least one snow groomer vehicle is active on one of the plurality of ski runs, the central unit is configured to: detect a presence of any users on that ski run, and responsive to a detected presence of at least one user on that ski run, cause an alarm signal to be communicated to the snow groomer vehicle.

6. The management system of claim 1, wherein the image sensor is housed on the snow gun.

7. The management system of claim 1, wherein the processing unit comprises at least one of a central control unit of the artificial-snow system and a local control unit of the snow gun.

8. The management system of claim 1, wherein the central unit is in communication, via a communication system, with a central control unit of the artificial snow system and at least one local control unit of the snow gun.

* * * * *